(12) United States Patent
Nakayama et al.

(10) Patent No.: US 8,748,770 B2
(45) Date of Patent: Jun. 10, 2014

(54) POWER SWITCHING APPARATUS

(75) Inventors: Yuta Nakayama, Chiyoda-ku (JP);
Masahiro Arioka, Chiyoda-ku (JP);
Tomotaka Yano, Chiyoda-ku (JP);
Kyoichi Otsuka, Chiyoda-ku (JP);
Satoru Yoshida, Chiyoda-ku (JP); Koji Sano, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 284 days.

(21) Appl. No.: 13/383,420

(22) PCT Filed: Aug. 30, 2010

(86) PCT No.: PCT/JP2010/064711
§ 371 (c)(1),
(2), (4) Date: Jan. 11, 2012

(87) PCT Pub. No.: WO2011/052288
PCT Pub. Date: May 5, 2011

(65) Prior Publication Data
US 2012/0103941 A1    May 3, 2012

(30) Foreign Application Priority Data
Oct. 29, 2009   (JP) ................. 2009-248634

(51) Int. Cl.
*H01H 33/14*   (2006.01)
(52) U.S. Cl.
USPC .................. 218/7; 218/154; 218/43; 218/78
(58) Field of Classification Search
USPC .......................................... 218/43, 78, 154, 7
See application file for complete search history.

(56) References Cited

U.S. PATENT DOCUMENTS 3,983,345 A * 9/1976 Phillips ......................... 218/122
4,467,306 A   8/1984 Morishita
(Continued)

FOREIGN PATENT DOCUMENTS

CN  201233801 Y  5/2009
JP  59-167412 U  11/1984
(Continued)

OTHER PUBLICATIONS

Office Action issued by the Korean Patent Office on Apr. 15, 2013, in the corresponding Korean Patent Application No. 10-2012-7005609, and an English Translation thereof. (8 pages).

(Continued)

*Primary Examiner* — Truc Nguyen
(74) *Attorney, Agent, or Firm* — Buchanan Ingersoll & Rooney PC

(57) ABSTRACT

A power switching apparatus includes: a pressure tank having tube-like openings in a shank portion and having an insulating gas sealed therein; a vacuum valve housed in the pressure tank and connected to the pressure tank at one end; bushing conductors penetrating through the openings of the pressure tank and electrically connected to the vacuum valve; and current transformers provided on an outside of the pressure tank and measuring a current flowing through the bushing conductors. Tube-like current transformer installation portions on which to install the current transformers are provided above the openings of the pressure tank and an outside diameter of the openings of the pressure tank is made larger than an outside diameter of the current transformer installation portions.

6 Claims, 2 Drawing Sheets

(56) References Cited

U.S. PATENT DOCUMENTS

| | | | |
|---|---|---|---|
| 6,198,062 B1* | 3/2001 | Mather et al. | 218/152 |
| 6,444,937 B1* | 9/2002 | Piazza | 218/68 |
| 6,495,785 B1* | 12/2002 | Meyer | 218/43 |
| 6,545,241 B1* | 4/2003 | Franchi et al. | 218/78 |
| 6,683,267 B1* | 1/2004 | Piazza et al. | 218/2 |
| 6,693,250 B2* | 2/2004 | Matsushita et al. | 218/3 |
| 6,784,392 B1* | 8/2004 | Piazza et al. | 218/7 |
| 6,888,086 B2* | 5/2005 | Daharsh et al. | 218/155 |
| 2002/0060204 A1 | 5/2002 | Tohya et al. | |
| 2004/0130858 A1 | 7/2004 | Lammers | |
| 2010/0288733 A1 | 11/2010 | Ichikawa et al. | |
| 2013/0155640 A1* | 6/2013 | Sano et al. | 361/816 |

FOREIGN PATENT DOCUMENTS

| | | |
|---|---|---|
| JP | 59-167413 U | 11/1984 |
| JP | 8-115642 A | 5/1996 |
| JP | 08-115642 A | 5/1996 |
| JP | 9-198943 A | 7/1997 |
| JP | 10-234113 A | 9/1998 |
| JP | 2000-341816 A | 12/2000 |
| JP | 2001-266681 A | 9/2001 |
| JP | 2002-159109 A | 5/2002 |
| JP | 2003-319515 A | 11/2003 |
| JP | 2004-129344 A | 4/2004 |
| JP | 2004-522396 A | 7/2004 |
| JP | 2005-73396 A | 3/2005 |
| JP | 2007-306701 A | 11/2007 |

OTHER PUBLICATIONS

International Search Report (PCT/ISA/210) issued on Oct. 12, 2010, by Japanese Patent Office as the International Searching Authority for International Application No. PCT/JP2010/064711.

Office Action from Chinese Patent Office dated Dec. 3, 2013, issued in corresponding Chinese Patent Application No. 201080037056.4, with English translation thereof.

* cited by examiner

US 8,748,770 B2

POWER SWITCHING APPARATUS

TECHNICAL FIELD

The present invention relates to a power switching apparatus employed in power transmission and distribution and power receiving systems.

BACKGROUND ART

A gas insulated switching apparatus in the related art using dry air seals dry air in a pressure tank at a high gas pressure of about 0.4 to 0.5 MPa-g in order to maintain electrical insulation and ensures insulation by further covering a conductor with an insulator (for example, Patent Document 1).

Also, regarding a current transformer incorporated into the gas insulated switching apparatus, a supporting rib for a current transformer, which is a heavy load, is provided to the pressure tank and the current transformer is installed on this supporting rib (for example, Patent Document 2).

PRIOR ART DOCUMENTS

Patent Documents

Patent Document 1: JP-A-2003-319515
Patent Document 2: JP-A-2007-306701

SUMMARY OF THE INVENTION

Problems that the Invention is to Solve

With the gas insulated switching apparatus in the related art as described above, the internal gas pressure of the pressure tank is a high gas pressure of about 0.4 to 0.5 MPa-g. Hence, in order to enable a low gas pressure, not only is it necessary to ensure insulation performance by providing an insulator to the conductor in a bushing, but it is also necessary to reduce the weight and the cost by making the current transformer supporting rib unnecessary while suppressing upsizing of the bushing and the current transformer.

The invention is devised to solve the problem as above and has an object to provide a power switching apparatus not only capable of ensuring insulation performance but also capable of achieving a reduction in weight and cost.

Means for Solving the Problem

A power switching apparatus of the invention includes: a pressure tank having tube-like openings branched from a shank portion and having an insulating gas sealed therein; a vacuum valve housed in the pressure tank and connected to the pressure tank at one end; bushing conductors penetrating through the openings of the pressure tank and electrically connected to the vacuum valve; and current transformers provided on an outside of the pressure tank and measuring a current flowing through the bushing conductors. Current transformer installation portions on which to install the current transformers are provided above the openings of the pressure tank and an outside diameter of the openings of the pressure tank is made larger than an outside diameter of the current transformer installation portions.

Advantage of the Invention

According to the power switching apparatus of the invention, it becomes possible to install the current transformers above the openings of the pressure tank without the need of special supporting members, such as current transformer supporting ribs, while ensuring desired insulation performance. Hence, a reduction in weight and cost can be achieved.

MODES FOR CARRYING OUT THE INVENTION

First Embodiment

Figure 1:
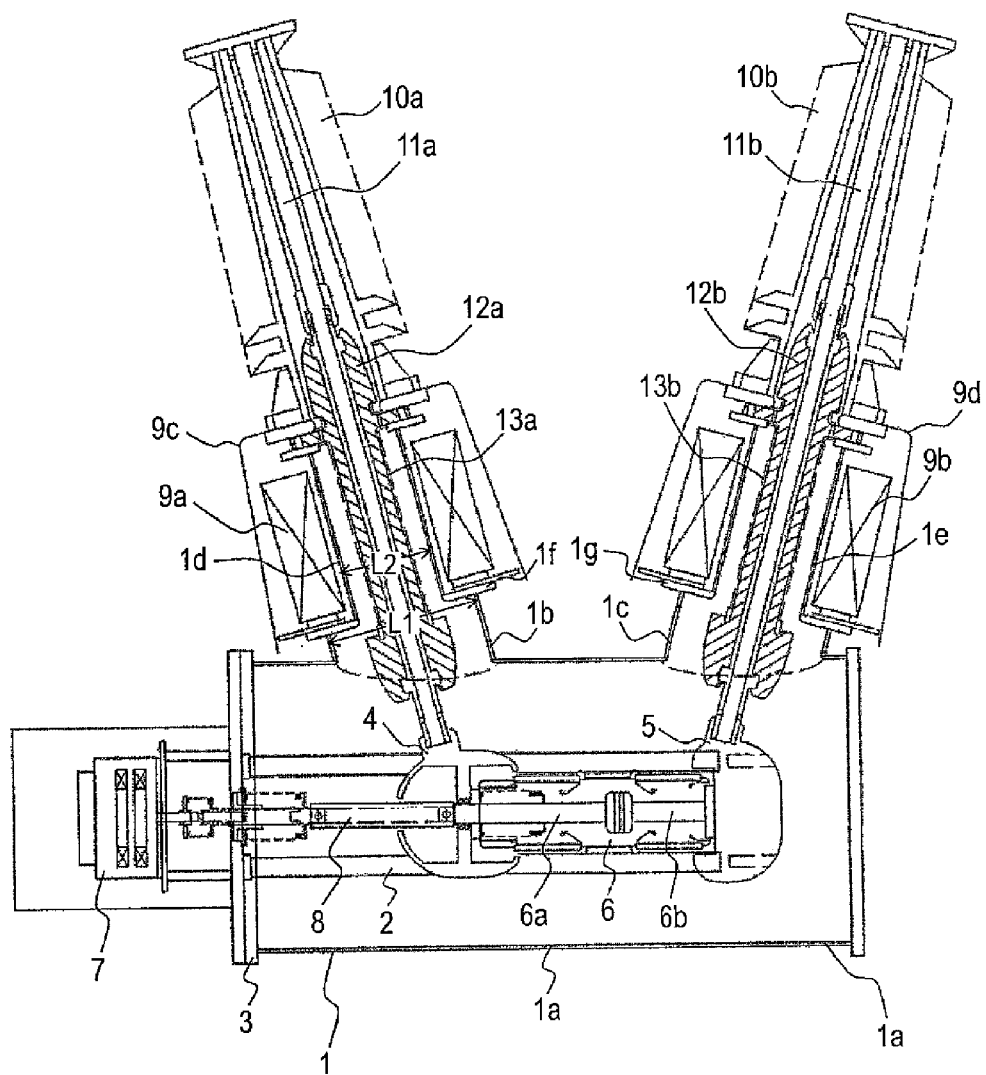
FIG. 1 is a cross section showing a power switching apparatus according to a first embodiment of the invention.

FIG. 1 is a cross section showing a power switching apparatus according to a first embodiment of the invention.

Referring to FIG. 1, an electrically grounded pressure tank 1 is installed with a cylindrical shank portion 1a in a horizontal posture. A pair of cylindrical openings 1b and 1c is provided on an upper side of the pressure tank 1. Also, cylindrical current transformer installation portions 1d and 1e are provided above and coaxially with the openings 1b and 1c, respectively, and integrally coupled to the openings 1b and 1c with flanges 1f and 1g, respectively.

An insulated supporting tube 2 is supported on a supporting plate 3 at one end in a horizontal direction of the shank portion 1a of the pressure tank 1. The insulated supporting tube 2 is provided with conducting movable-end contact case 4 and immovable-end contact case 5 which are spaced apart from each other. A vacuum valve 6 is supported between these contact cases and a movable-end electrode conductor 6a and an immovable-end electrode conductor 6b thereof are supported in a horizontal posture. The movable-end electrode conductor 6a of the vacuum valve 6 is connected to an insulated operation rod 8 operated by an operation mechanism 7 and inserted through and electrically connected to the movable-end contact case 4. The immovable-end electrode conductor 6b of the vacuum valve 6 is electrically connected to the immovable-end contact case 5.

An outside diameter L1 of the openings 1b and 1c of the pressure tank 1 is formed larger than an outside diameter L2 of the current transformer installation portions 1d and 1e. On the outside of the pressure tank 1, current transformers 9a and 9b are supported, respectively, on the flanges 1f and 1g as supporting portions, which are provided at step portions between the openings 1b and 1c and the current transformer installation portions 1d and 1e, respectively. For example, the outside diameter L1 of the openings 1b and 1c is set to about 300 mm and the outside diameter L2 of the current transformer installation portions 1d and 1e is set to about 200 mm. Reference numerals 9c and 9d denote protective covers covering the current transformers 9a and 9b, respectively.

Bushings 10a and 10b are fixedly installed above the pressure tank 1. Bushing conductors 11a and 11b surrounded by the bushings are connected, respectively, to the movable-end contact case 4 and the immovable-end contact case 5 by penetrating through the current transformer installation portions 1d and 1e and the openings 1b and 1c of the pressure tank 1, respectively.

Further, intermediate bushings 12a and 12b made of an insulator, such as thermo-setting resin, are provided to the bushing conductors 11a and 11b in portions corresponding to the current transformer installation portions 1d and 1e, respectively. An outside diameter of the intermediate bushings 12a and 12b is formed in such a manner that portions corresponding to the openings 1b and 1c are larger than portions corresponding to the current transformer installation portions 1d and 1e. The intermediate bushings not only ensure insulation performance in portions where an insulation distance is short, such as bushing attachment portions and the current transformer installation portions, but also reduce a space field in a large-diameter portion.

Reference numerals 13a and 13b denote ground layers made of conductive rubber or conductive coating materials and provided on the surfaces of the intermediate bushings 12a and 12b, respectively. By ground layer 13a and 13b a space defined with the pressure tank 1 on the outer side of the ground layers can be extremely small. The current transformer installation portions 1d and 1e of the pressure tank 1 can be therefore made smaller.

Also, as an insulating gas, dry air (maximum use gas pressure: lower than 2 MPa-g) having a water content of 10 ppm or less is sealed in the pressure tank 1 and the bushings 10a and 10b.

The pressure tank 1 can be manufactured by forming the shank portion 1a, the openings 1b and 1c, and the current transformer installation portions 1d and 1e from a steel plate and then putting them together into one piece by welding or from a casting including the openings 1b and 1c and the current transformer installations 1d and 1e.

Also, the openings 1b and 1c can be either of a substantially cylindrical shape or a substantially conical shape.

As has been described, according to the first embodiment, the power switching apparatus includes: the pressure tank 1 having the tube-like openings 1b and 1c in the shank portion 1a and having an insulating gas sealed therein; the vacuum valve 6 housed in the pressure tank and connected to the pressure tank at one end; the bushing conductors 11a and 11b penetrating through the openings 1b and 1c of the pressure tank 1 and electrically connected to the vacuum valve 6; and the current transformers 9a and 9b provided on the outside of the pressure tank 1 and measuring a current flowing through the bushing conductors 11a and 11b. The tube-like current transformer installation portions 1d and 1e on which to install the current transformers 9a and 9b are provided above the openings 1b and 1c of the pressure tank 1 and the outside diameter L1 of the openings 1b and 1c of the pressure tank 1 is made larger than the outside diameter L2 of the current transformer installation portions 1d and 1e. Accordingly, strength against bending can be enhanced without the need of a special supporting member, such as the current transformer supporting ribs. Hence, the current transformers 9a and 9b can be readily installed, respectively, above the openings 1b and 1c of the pressure tank 1. A reduction in weight and cost can be therefore achieved.

Also, the diameter of the intermediate bushings 12a and 12b provided to the busing conductors 11a and 11b, respectively can be increased, respectively, in the openings 1b and 1c of the pressure tank 1. A creeping field and a space field can be therefore reduced.

Further, because the outside diameter of the current transformer installation portions 1d and 1e is smaller than the outside diameter of the openings 1b and 1c, the pressure tank 1 can be reduced in weight and the current transformers 9a and 9b can be reduced in size. The cost can be consequently reduced.

Second Embodiment

Figure 2:
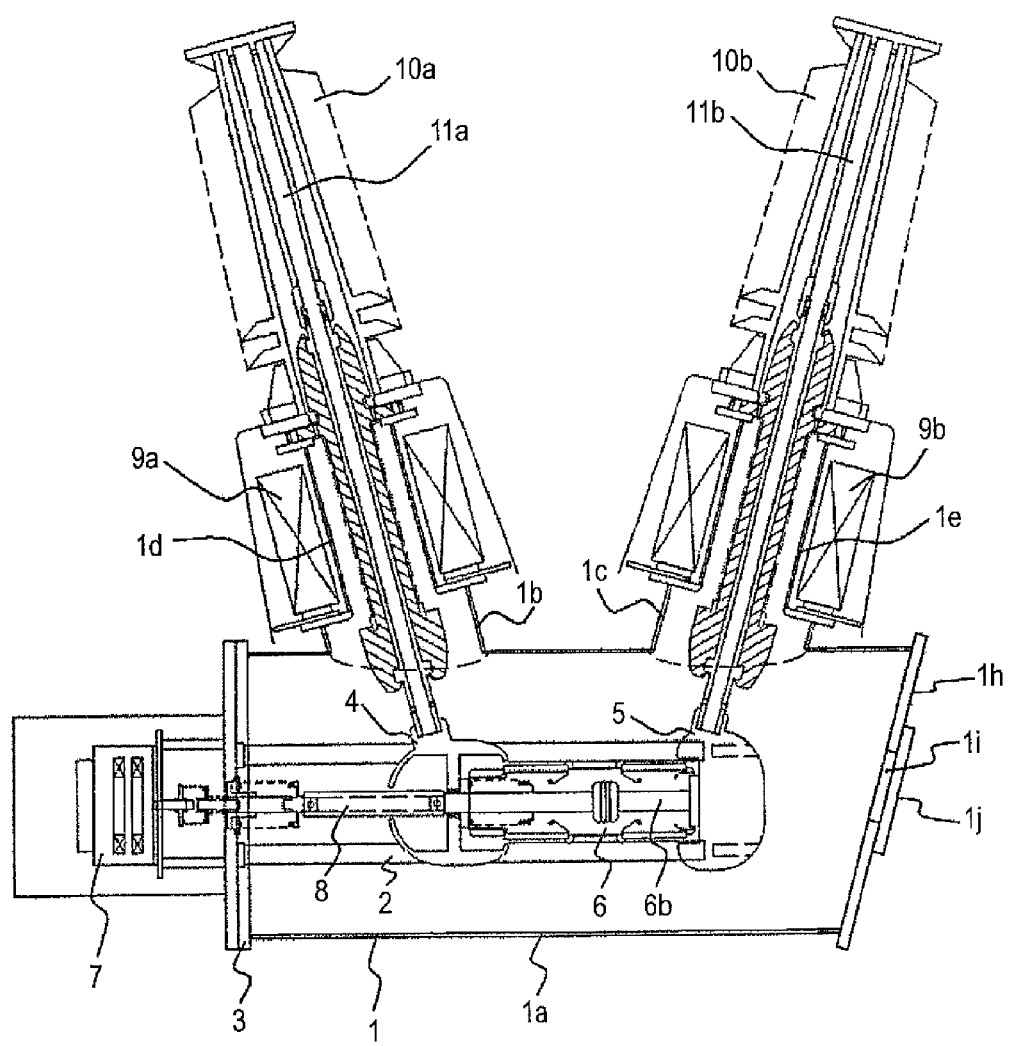
FIG. 2 is a cross section showing a power switching apparatus according to a second embodiment of the invention.

FIG. 2 is a cross section of a power switching apparatus showing a second embodiment. Referring to the drawing, the openings 1b and 1c and the current transformer installation portions 1d and 1e provided on the upper side of the shank portion 1a of the pressure counter 1 are of the same structures as the counterparts in the first embodiment above. Because the pressure tank 1 is installed to a level about as high as an individual from the ground, as is shown in the drawing, a flange 1h opposing the immovable-end electrode conductor 6b of the vacuum valve 6 in the shank portion 1a of the pressure tank 1 is provided to incline downward and provided with an inspection hole 1i and a hole cover 1j to make the inside of the pressure tank 1 visible from below.

Because connection portions of the bushing conductors 11a and 11b at the both ends of the vacuum valve 6 are visible through the inspection hole 1i, when a part above the openings 1b and 1c on the pressure tank upper side needs replacement in case of a failure, a replacing work becomes possible without having to open the flange 1h.

Because the flange 1h is inclined downward so that the inspection hole 1i faces downward, it becomes possible to prevent bright sky from being reflected thereon even when the switching apparatus is installed outdoors. The inside can be therefore confirmed readily through the hole.

According to this embodiment, foreign metallic particles generated due to poor assembly can be readily found after the completion of assembly through the inspection hole 1i provided to the flange 1h. Failures can be therefore reduced.

DESCRIPTION OF REFERENCE NUMERALS AND SIGNS

1: pressure tank
1a: shank portion
1b and 1c: openings
1d and 1e: current transformer installation portions
1f and 1g: flanges
1h: flange
1i: inspection hole
1j: hole cover
2: insulated supporting tube
3: supporting plate
4: movable-end contact case
5: immovable-end contact case
6: vacuum valve
6a: movable-end electrode conductor
6b: immovable-end electrode conductor
7: operation mechanism
8: insulated operation rod
9a and 9b: current transformers
9c and 9d: protective covers
10a and 10b: bushings
11a and 11b: bushing conductors
12a and 12b: intermediate bushings
13a and 13b: ground layers

The invention claimed is:
1. A power switching apparatus comprising:
a pressure tank having tube-like openings branched from a shank portion and having an insulating gas sealed therein;
a vacuum valve housed in the pressure tank and connected to the pressure tank at one end;
bushing conductors penetrating through the openings of the pressure tank and electrically connected to the vacuum valve; and
current transformers provided on an outside of the pressure tank and measuring a current flowing through the bushing conductors,
wherein:

tube-like current transformer installation portions on which to install the current transformers are provided above the openings of the pressure tank and an outside diameter of the openings of the pressure tank is made larger than an outside diameter of the current transformer installation portions; and intermediate bushings made of an insulator and having a larger outside diameter in a portion corresponding to the openings than in a portion corresponding to the current transformer installation portions are provided along outer circumferences of the bushing conductors.

2. The power switching apparatus according to claim 1, wherein:
the current transformer installation portions are formed integrally with the openings of the pressure tank.

3. The power switching apparatus according to claim 1 wherein:

a flange having an inspection hole is provided to the pressure tank at an end opposing an immovable-end electrode conductor in the vacuum valve so as to incline downward.

4. The power switching apparatus according to claim 1, wherein:
dry air having a water content of 10 ppm or less is sealed in the pressure tank as the insulating gas.

5. The power switching apparatus according to claim 1, wherein:
the pressure tank is manufactured by welding or from a casting.

6. The power switching apparatus according to claim 1, wherein:
the openings of the pressure tank are of either a substantially cylindrical shape or a substantially conical shape.

* * * * *